(12) United States Patent
Viviroli

(10) Patent No.: US 10,833,492 B2
(45) Date of Patent: Nov. 10, 2020

(54) CUTTING UNIT FOR STRIPPING CABLES

(71) Applicant: Komax Holding AG, Dierikon (CH)

(72) Inventor: Stefan Viviroli, Horw (CH)

(73) Assignee: KOMAX HOLDING AG, Dierikon (CH)

( * ) Notice: Subject to any disclaimer, the term of this patent is extended or adjusted under 35 U.S.C. 154(b) by 690 days.

(21) Appl. No.: 14/970,659

(22) Filed: Dec. 16, 2015

(65) Prior Publication Data

US 2016/0181774 A1  Jun. 23, 2016

(30) Foreign Application Priority Data

Dec. 17, 2014 (EP) ..................................... 14198601

(51) Int. Cl.
*H02G 1/12* (2006.01)

(52) U.S. Cl.
CPC ........... *H02G 1/1253* (2013.01); *H02G 1/127* (2013.01)

(58) Field of Classification Search
CPC .... H02G 1/1253; H02G 1/127; H02G 1/1258; H02G 1/1248; H02G 1/1236; H02G 1/12; H02G 1/1202; H02G 1/1207; H02G 1/1209; H02G 1/1212; H02G 1/1214; H02G 1/1241; H02G 1/1251; H02G 1/1256
USPC .................................................... 81/9.51, 9.4
See application file for complete search history.

(56) References Cited

U.S. PATENT DOCUMENTS

| | | | | |
|---|---|---|---|---|
| 2,899,996 A * | 8/1959 | Stockman | .............. | B25G 1/125 29/764 |
| 2,956,717 A | 10/1960 | Scharf | | |
| 3,416,227 A * | 12/1968 | McDonald | ........... | H02G 1/1212 30/348 |
| 3,645,156 A * | 2/1972 | Meyer | .................. | H02G 1/1258 83/862 |
| 4,000,362 A * | 12/1976 | Kawaguchi | .......... | H01B 7/0208 174/120 SR |
| 5,375,485 A * | 12/1994 | Hoffa | ................... | H02G 1/1256 29/825 |
| 6,415,499 B1 * | 7/2002 | Holland | .................. | B25B 27/10 29/564.4 |
| 2009/0013477 A1 * | 1/2009 | Agronin | .................... | B25B 7/00 7/107 |
| 2015/0026984 A1 * | 1/2015 | Neubauer | .............. | H01R 43/28 30/90.1 |

(Continued)

FOREIGN PATENT DOCUMENTS

| | | |
|---|---|---|
| DE | 202011107872 U1 | 4/2013 |
| EP | 0623982 A1 | 11/1994 |

(Continued)

*Primary Examiner* — Bryan R Muller
*Assistant Examiner* — Joel D Crandall
(74) *Attorney, Agent, or Firm* — William J. Clemens; Shumaker, Loop & Kendrick, LLP

(57) ABSTRACT

A cutting unit for stripping cables in a stripping station includes a base body and a knife holder attached thereto for holding stripping knives. The knife holder is firmly glued to the base body by an epoxy-resin adhesive, whereby the stripping knives are electrically isolated from the base body. The stripping knives are screw-connected with the knife holders. For the reading-out of electrical signals for detection of contact with a conductor the cutting unit has a printed circuit board that is electrically connected with the knife holders by contact screws.

12 Claims, 2 Drawing Sheets

(56) References Cited

U.S. PATENT DOCUMENTS

2016/0054251 A1* 2/2016 Deschler .............. H02G 1/1248
  81/9.51

FOREIGN PATENT DOCUMENTS

| EP | 1515410 A2 | 3/2005 | |
|---|---|---|---|
| GB | 2187338 A * | 9/1987 | ........... H02G 1/1258 |
| JP | H0787643 A | 3/1995 | |
| JP | 2008295209 A | 12/2008 | |
| JP | WO 2012015062 A1 * | 2/2012 | ............ H01R 43/28 |
| WO | 2012015062 A1 | 2/2012 | |
| WO | 2014147596 A1 | 9/2014 | |
| WO | WO 2014147596 A1 * | 9/2014 | ........... H02G 1/1253 |

* cited by examiner

Monitoring Arrangement

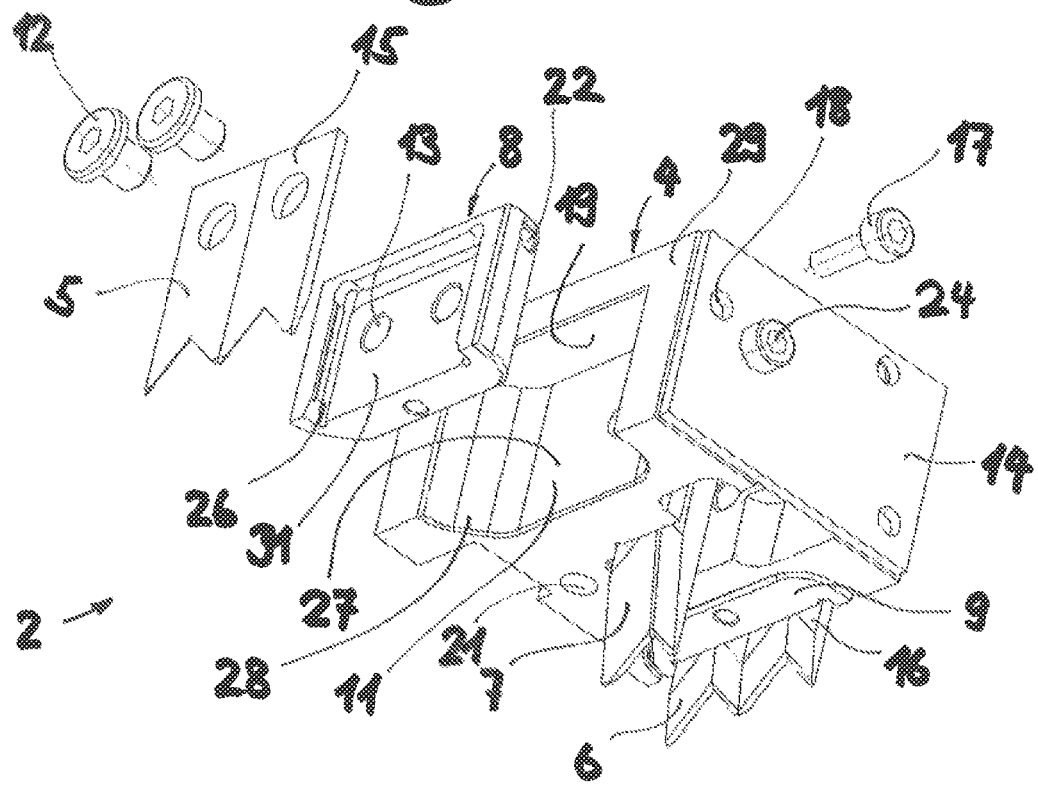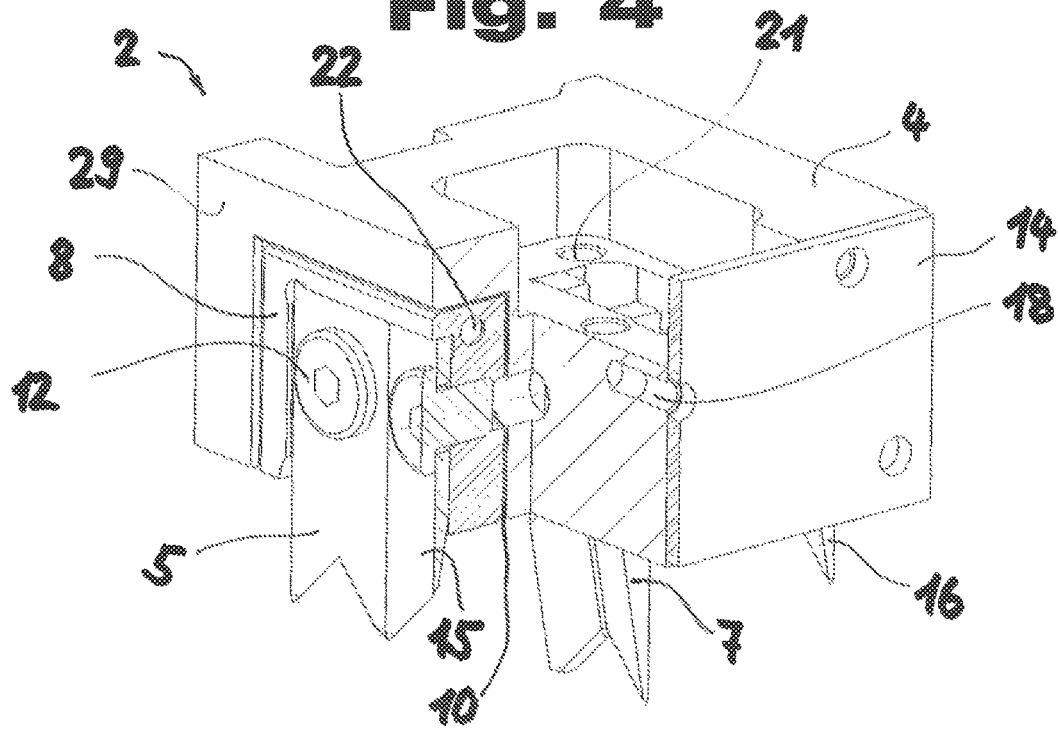

CUTTING UNIT FOR STRIPPING CABLES

FIELD

The invention relates to a cutting unit for stripping cables in a stripping station, for example a cable processing machine. In addition, the invention relates to a method of producing a cutting unit of that kind.

BACKGROUND

When stripping is carried out, a cable casing or the cable insulation of an electrical cable is cut into by means of stripping knives and the cable casing is pulled off by means of a withdrawing movement, so that ultimately a cable end with a bare conductor is present. Stripping stations have been customary for a longer period of time and have become known from, for example EP 623 982 B1 and EP 1 515 410 B1. These stripping stations comprise a knife head with upper and lower cutting units with knives which are arranged in pairs and are movable relative to one another. The cutting units have severing knives for cutting through the cable. The two cable ends obtained by the severing process are thereafter simultaneously stripped by means of front and back stripping knives of the knife head for stripping the trailing and leading cable ends.

The conductor of the cable should not be damaged by the knife during the stripping process. Damage can arise if the conductor has been contacted by the stripping knife. Due to constantly increasing demands on quality in mechanically performed stripping processes there is a need to monitor this stripping process. Modern stripping stations therefore have detecting devices for detecting contact with a conductor by the stripping knife. A monitoring arrangement of that kind has become known from, for example, WO 2012/015062. In order to carry out the method with this monitoring arrangement it is necessary to electrically isolate the stripping knife so that conductor detection is possible. For this purpose, use is made in practice of isolating parts of ceramic which are installed between the stripping knives and a base body.

SUMMARY

It is accordingly an object of the present invention to avoid the disadvantages of the prior art and, in particular, to create a cutting unit of the aforesaid kind which is simple to produce.

According to the invention this object is fulfilled by the cutting unit for stripping cables in a stripping station of, for example, a cable processing machine that comprises a base body which can be dockable or docked at the stripping station. The base body can be an integral, monolithically constructed shaped body of, for example, a metallic material, such as, for example, steel. In addition, the cutting unit comprises at least one stripping knife. Due to the fact that the mentioned at least one stripping knife is electrically isolated from the base body by an adhesive or sealing material, the cutting unit can be produced in simple manner and with low production costs. Thanks to the adhesive or sealing material a secure and long-life direct or indirect attachment of the stripping knife to the base body results. The adhesive or sealing material additionally ensures the desired electrical separation between base body and stripping knife.

The aforesaid stripping knife can be glued to the base body directly by means of the adhesive or sealing material. However, it is particularly advantageous if the cutting unit comprises at least one knife holder, which is attached or attachable to the base body, for holding the at least one stripping knife. Thanks to the stripping knife, wider possibilities of use for the cutting unit arise.

The adhesive or sealing material can be arranged between stripping knife and knife holder or between knife holder and base body or possibly even not only between stripping knife and knife holder, but also between knife holder and base body. However, it is particularly advantageous if only the knife holder is firmly glued to the base body by means of the adhesive or sealing material at the base body.

The adhesive or sealing material can be an epoxy-resin adhesive. Apart from the electrical insulation effect this adhesive is distinguished by high strength and easy workability. However, other high-strength adhesives, which ensure a secure, long-term and precise positioning of the stripping knife in the cutting unit, are also possible.

It can be advantageous if the stripping knife is attached to the knife holder by way of a releasable connection. Stripping knives with worn blades can thus be exchanged in simple manner.

For simple mounting and demounting the stripping knife is, with particular advantage, screw-connected with the knife holder. The screw connection is in that case advantageously designed in such a way the screw for attaching the insulating knife to the knife holder is received only in the knife holder and does reach as far as the base body. In this way it can be ensured that no undesired electrical connection between stripping knife and base is created.

The base body can have a recess for receiving the knife holder. The recess can in that case be preferably formed to be complementary to the at least one stripping knife, whereby a particularly precise and positionally secure location of the stripping knife at or in the knife holder is made possible.

The afore-mentioned recess can preferably be formed to be pocket-shaped, which makes possible simple mounting of the knife holder on the base body. A simple and positionally accurate mounting is important above all for adhesives which cure comparatively quickly. With such a design the respective working steps for assembling the knife unit can be carried out by machine.

In addition, the stripping knife can be arranged in a knife mount for mounting the at least one stripping knife. This knife mount can be formed to be pocket-shaped. The knife mount can, for example, be designed in such a way that the stripping knife can be pushed into the respective knife mount and thus the stripping knife or knives secured transversely to the push-in direction.

For simpler machine variants the base body can comprise only one knife holder. Advantageously, the base body can comprise two knife holders, wherein a first or front knife holder is arranged at one side of the base body and a second or rear knife holder is arranged at an opposite side of the base body. In that case, at least one stripping knife can be fastened to each knife holder. With particular preference, in each instance two stripping knives can be fastened to each knife holder, wherein the two stripping knives can be arranged to lie adjacent to one another. The stripping knives can have respective V-shaped cutting edges.

In a further form of embodiment the cutting unit has front and back stripping knives for stripping a trailing and a leading cable end and a severing knife arranged between the front and back stripping knives. In that case, the front and back stripping knives can be arranged at opposite outer sides of the base body and the severing knife centrally at the base body. A respective stripping knife, two stripping knives adjacent to one another or a plurality of stripping knives can be mounted on the base body at each of the front side and rear side directly or indirectly by way of the afore-described knife holder.

The cutting unit can comprise electrical connections or interfaces for the reading-out of electrical signals for detection of instances of contact with a conductor. The electrical connections or interfaces can in that case be arranged at or associated with the base body. Insofar as the cutting unit has a knife holder for mounting of the stripping knife it is advantageous if the electrical connections or interfaces are associated with the knife holder.

It can be particularly advantageous if the cutting unit has a printed circuit board which is electrically connected with the knife holder. The electrical connection can be secured by means of, for example, a contact-making screw which electrically connects the printed circuit board with the knife holder. The printed circuit board can be constructed as a one-sided circuit board, wherein the conductor tracks are arranged on the side remote from the base body.

A further aspect of the invention is directed to a stripping station for stripping cables. The stripping station comprises a knife head with at least one upper cutting unit and lower cutting unit, wherein for preference two cutting units, i.e. the upper cutting unit and the lower cutting unit, are designed as described in the preceding. Moreover, the stripping station comprises a monitoring arrangement, which has an inductive or capacitive mode of functioning, for assessing conductor contacts. Monitoring arrangements of that kind have become known from, for example, WO 2014/060218 A1, WO 2012/015062 A1 and DE 10 2007 053 825 A1.

Finally, the invention relates to a method of producing a cutting unit for a stripping station for stripping cables. The method is distinguished by the fact that at least one stripping knife is attached by gluing to a base body or connected with the base body directly or by way of a knife holder for holding the stripping knife.

An advantageous method can result if knife holders for holding the stripping knife are made oversize, one or more such knife holders are glued to the base body and, after the gluing process, the knife holder or holders is or are finished to the desired size.

With particular advantage for the formation of a cutting unit pair consisting of upper cutting unit and lower cutting unit, two base bodies with knife holders respectively glued thereto are provided, wherein the knife holders of the two base bodies are brought in a common production step to the desired size. With particular advantage, the respective stripping knives are fastened to the finished knife holders, for example by screw-connecting, only after the end of the mentioned production step in which the knife holders are brought to the desired size.

DESCRIPTION OF THE DRAWINGS

Further individual features and advantages are evident from the following description of an embodiment and from the drawings, in which:

FIG. 3 shows the cutting unit of FIG. 2 in a partly exploded illustration and FIG. 4 shows a perspective illustration with a partial section of the cutting unit.

DETAILED DESCRIPTION

Figure 1:
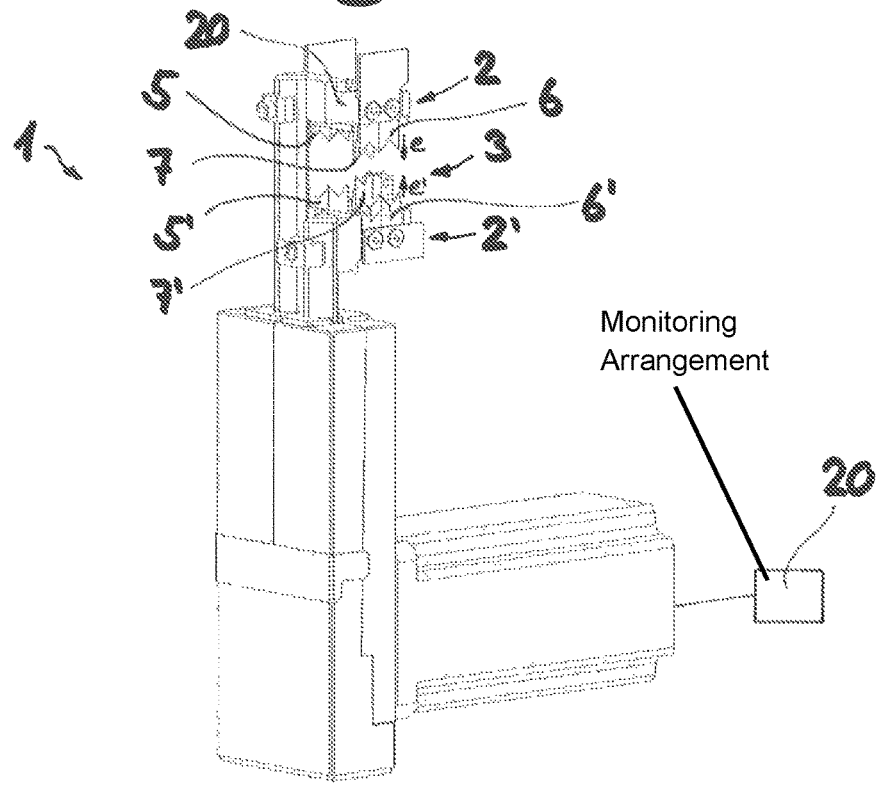
FIG. 1 shows a perspective illustration of a stripping station.

FIG. 1 shows a stripping station, which is denoted overall by 1, for stripping cables (not illustrated). The stripping station 1 comprises a knife head 3 with an upper cutting unit 2 and a lower cutting unit 2'. The upper and lower cutting units 2 and 2' are movable relative to one another by means of a drive. The adjusting movements of the cutting units 2, 2' are indicated by arrows e, e'. Stripping stations 1 of that kind have been known and conventional—apart from the cutting units 2, 2' described in detail in the following in FIGS. 2 to 4—per se for a longer period of time. The linear movement of the cutting units 2, 2' can, for example, be effected relative to one another by way of racks, as described in EP 623 982 B1. A further stripping station has become known from, for example, EP 1 515 410 B1. The rotational movement of the drive motor according to the last-mentioned specification is converted by means of a linear unit into the linear movement for moving the upper and lower cutting units 2, 2'. The knife head 3 has the following three knives arranged in pairs: A front stripping knife pair 5, 5', a back stripping knife pair 6, 6' and a severing knife pair 7, 7'. A cable can be cut to length by the severing knives 7 and 7'. Thereafter, the cable ends arising through the separating process can be simultaneously stripped by the stripping knives 5 and 5' and the stripping knives 6, 6'. In the present embodiment, the stripping knives 5, 5' and 6, 6' are, as apparent shortened relative to the severing knives 7, 7', so that during a first part of the working stroke of the drive for the knife head only the cable is severed. Thereafter, a withdrawal drive (not illustrated) draws back the cable ends from the severing point to the desired stripping length, whereupon during a second part of the working stroke of the knife drive the insulation of the electrical cable is cut into. The cut-into insulation sleeves can thereafter be pulled off.

When incision by stripping knives takes place then as a rule the incision depth is to be such that the insulation is cut into as deeply as possible, but without causing a notch on one or more strands, which consist of, for example, copper material or aluminum, of the conductor. For the pulling off, the incision depth is frequently somewhat reduced so that the stripping knives do not scrape over the strands, because contact with the cable during pulling off could have the consequence that the stripped cable can no longer be further used and represents waste. For example, problems with cables damaged in that way can arise in downstream crimping. Contact with the cable during pulling off could have the consequence that due to the reduction in the copper mass the strand packet can no longer be sufficiently compacted in the case of, for example, downstream crimping or that strands pulled forward cause short circuits with other electrical components. Notches can additionally have the consequence that strands break, during crimping or only later, due to mechanical loads and thus the conductive cross-section and the mechanical strength of the connection are reduced. The stripping station 1 therefore has a monitoring arrangement 20 for assessing conductor contacts. Such a monitoring arrangement is symbolically illustrated in FIG. 1 and denoted by '20'. The monitoring arrangement 20 has an inductive or capacitive mode of functioning. Technical details with regard to monitoring arrangements 20 of that kind are inferrable from, for example, WO 2014/060218 A1, WO 2012/015062 A1 and DE 10 2007 053 825 A1. WO 2012/015062 A1 describes, for example, a method for detecting contact with a conductor by stripping knives, in which a circuit measures an impedance. If the impedance changes during the pulling-off process because the stripping knife contacts the conductor, this is indicated as a fault report. For the detection method with the mentioned monitoring arrangements with inductive or capacitive mode of function it is necessary to electrically isolate the stripping knives. The knife head 3 of the stripping station 1 has for that purpose cutting units 2, 2' in which the stripping knives 5, 5' and 6, 6' are each electrically isolated from the associated base body 4 by an adhesive or sealing material. Details with respect to this advantageous form of the electrical isolation of the stripping knives are shown in detail in the following FIGS. 2 to 4.

Figure 2:
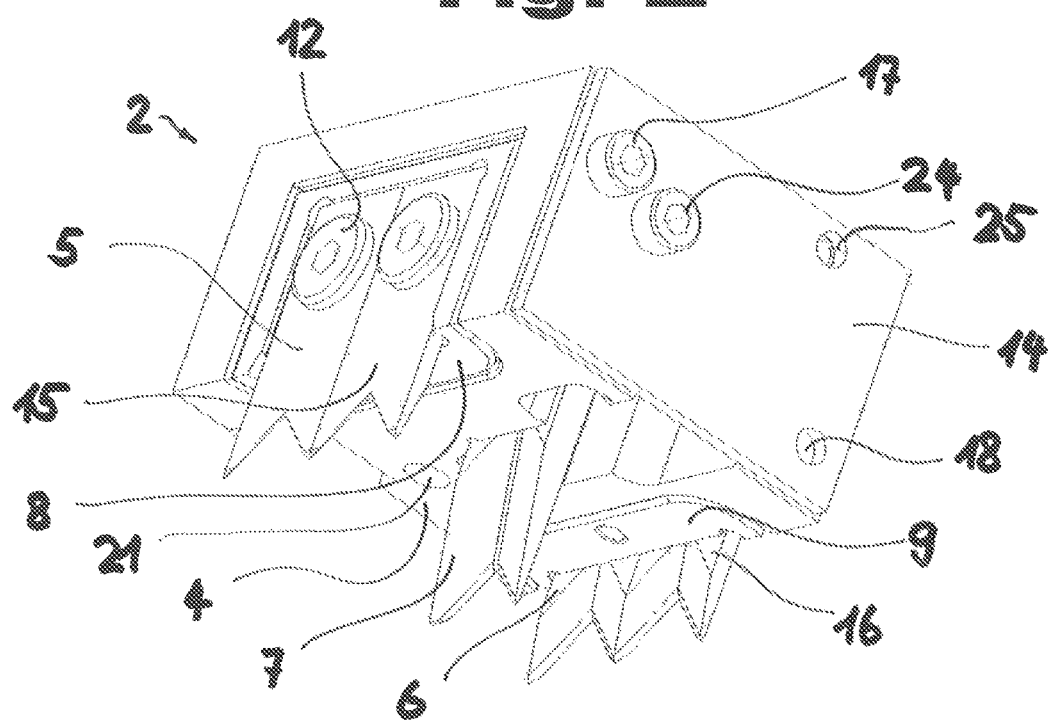
FIG. 2 shows a perspective illustration of a cutting unit according to the invention for a stripping station.

FIG. 2 shows a cutting unit 2 for a stripping station for stripping cables. The cutting unit 2 comprises a base body 4, which is equipped with front stripping knives 5, 15, back stripping knives 6, 16 and a severing knife 7 arranged centrally therebetween. A cable can be cut to length by the severing knife 7. Thereafter, the cable ends which have arisen by this severing process are simultaneously stripped. The front stripping knifes 5, 15 in that case serve for stripping a trailing cable end; the back stripping knives 6, 16 serve for stripping a leading cable end. The base body can be docked at the stripping station. For that purpose, the base body 4 has bores 21 for fastening screws for fastening the cutting unit 2 to the stripping station 1. Stripping knives 5, 15 and 6, 16 are disposed at mutually opposite outer sides of the base body 4. Two stripping knives 5, 15 or 6, 16 arranged adjacent to one another are provided for each outer side. The stripping knives 5 and 15 are on one side and the stripping knives 6 and 16 on the opposite side. Knife holders 8 and 9 are arranged between the stripping knives 5, 15 or 6, 16 and the base body. These knife holders 8, 9 are attached to the base body 4 by means of an electrically insulating adhesive or sealing material at the base body. The stripping knives are attached to the knife holders 8, 9 by means of screws 12, wherein the attachment is such that there is no contact with the base body 4 by the screws 12. The stripping knives are thus, as apparent, electrically separated from the base body 4 by the adhesive or sealing material. Instead of the machine variant shown here with front and back stripping knives as well as separate severing knives, the described solution for electrical separation of the stripping knives from the base body is obviously also advantageous and usable for simpler machines. In simpler cable processing machines, for example, only one set of stripping knives is present; the function of the severing knives can be taken over by the stripping knives.

Electrical connections are provided for the reading-out of electrical signals for detection of contact with a conductor. For this purpose, a printed circuit board 14 connected with the monitoring unit 20 is arranged at a transverse side of the base body 4. The printed circuit board 14 is electrically connected with the knife holders 8, 9. Screws 17 and 24 serve for attaching the printed circuit board 14. The outer screws 17 respectively extend up to the knife holders 8 and 9, whereby an electrical contact between printed circuit board and knife holder is produced. These screws are therefore also termed "contact-making screws" in the following. A receiving opening 18 for the contact-making screw 17, which is associated with the knife holder 9, can be seen in FIG. 2 in the left-hand region of the printed circuit board 14. The two screws 24 serve for attaching the printed circuit board 14 to the base body 4. The screws 24 are therefore also termed "fastening screws" in the following. However, the second fastening screw is not illustrated in FIG. 2, as a result of which the associated receiving opening 25 can be seen.

In the present case, the base body is an integral, monolithically constructed shaped body. This base body 4 is preferably made of a metallic material, for example of steel. The base body can be produced in simple manner by means of a machining method. Similarly, the knife holder 8, 9 advantageously consists of a metallic material, particularly advantageously of the same material as the base body 4. The knife holder 8 or 9 can similarly be produced in simple manner by a machining method.

Further details with regard to the cutting unit 2 can be inferred from FIGS. 3 and 4. It is evident from FIG. 3 that the base body 4 has a pocket-shaped recess 11 for receiving the knife holder 8. The recess 11 has an end surface 19, which extends at a right angle to a receiving base 27 and which forms an abutment in upward direction. Side wall sections 28, which form the transition between receiving base 27 and outer side 29 of the base body 4, are laterally connected with the receiving base 27. The pocket-shaped recess 11 has, as is apparent, the shape of a trough with rounded trough sides formed by the sections 28. The knife holder 8 is formed to be complementary with the pocket-shaped recess 11 and can be inserted in interlocking manner into the recess 11. The special shape of recess 11 and knife holder 8 enables simple and secure gluing.

The stripping knives 5, 15 are received in a knife mount 31 for mounting the two stripping knives 5, 15 arranged directly adjacent to one another. This knife mount 31 is formed as a pocket-shaped recess into which the stripping knives 5, 15 can be pushed from below. The knife mount 31 has laterally arranged undercuts 26 which extend in push-in direction and ensure guidance of the stripping knives during pushing in. The thus-inserted stripping knives 5, 15 are therefore positionally secured by means of the undercuts 26 transversely to the push-in direction.

A threaded hole 22, into which the contact-making screw 17 can be screwed, is arranged laterally at the knife holder 8. The associated screw mount is the round hole denoted by 18 in the printed circuit board 14.

As can be inferred from FIG. 4, the screws 12 extend as apparent only in the knife holder 8. The threaded section of the screw 12 ends, in other words, in a threaded hole 13 (FIG. 3) before the interface between base body 4 and knife holder 8. The screws 12 have, for example, a flat screw head with an internal hexagon. The stripping knives 5, 15 are thus attached to the knife holder 8 by way of a releasable connection. Thus, stripping knives with worn cutting edges can be exchanged in simple manner.

In FIG. 4, the connecting layer of the insulating adhesive between knife holder 8 and base body 4 is indicated by coloring-in and denoted by 10. The adhesive 10 is preferably an epoxy-resin adhesive which is distinguished by high strength and easy workability. Since the stripping knives 5, 6, 15, 16 are electrically separated from the base body 4 by the epoxy-resin adhesive 10, the cutting unit 2 can be produced in simple manner and with low production costs. The epoxy-resin adhesive ensures a secure and long-life indirect attachment of the stripping knives 5, 6, 15, 16 to the base body 4. As an alternative to the cutting unit 2, which is shown here, with knife holders 8, 9, which are attached to the base body, for holding the stripping knives 5, 6, 15, 16 it would also be conceivable for special fields of use to directly glue the stripping knives to the base body by means of the adhesive or sealing material. The adhesive connection has further advantages: The production costs are low. Moreover, the material for the knife holder 8, 9 does not have to be an electrically insulating material. Consequently, the material for the knife holders 8, 9 can, in itself, be freely selected. The mechanical characteristics and workability can thus be optimized. A further advantage consists in the very good assembly friendliness, since, apart from the stripping knives 5, 6, 15, 16 to be changed, no loose components are present. In addition, the printed circuit board 14 can, for example, remain at the knife holder 8, 9 when the stripping knives 5, 6, 15, 16 are exchanged.

Not only the stripping knives 5, 6, 15, 16, but also the severing knives 7 have, in the embodiment shown in the figures, V-shaped blades. However, the stripping knives could obviously also have straight blades or cutting edges or other cutting geometries (for example a curve).

For production of the cutting unit 2 for the stripping station 1 for the stripping of cables, the stripping knives 5, 15 or 6, 16 are connected with the base body directly or—as described beforehand by way of the embodiments—via a knife holder 8 or 9 for holding the stripping knives 5, 15 and 6, 16 by gluing. With respect to method, it can be advantageous if for holding the stripping knives 5, 15 or 6, 16 the respective knife holder 8 or 9 is made over-size, these knife holders 8, 9 are glued to the base body 4 and after the gluing process the knife holders 8, 9 are finished to the desired size. With particular advantage, for formation of a cutting unit pair consisting of upper cutting unit and lower cutting unit, two base bodies with knife holders respectively glued thereto are provided, wherein the knife holders of the two base bodies are brought to the desired size in a common production step. It is thus possible to keep the tolerances, which are critical for a faultless stripping process, to be very small and at the same time to optimize production costs. With particular advantage, the respective stripping knives 5, 15 or 6, 16 are attached by screw-connecting to the finished knife holders 8, 9 only after the conclusion of the finishing step in which the knife holders 8, 9 are brought to the desired size. The positional accuracy of the stripping knives 5, 15; 6, 16 fulfils, by arrangements of that kind, the highest requirements. Alternatively, the knife holders 8, 9 could be processed to finished size and then glued, dimensionally correctly, into the base body 4.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cutting unit for stripping cables in a stripping station, the cutting unit comprising:
    a metallic base body;
    a metallic knife holder mechanically attached to and electrically isolated from the base body;
    at least one stripping knife mechanically attached and electrically coupled to the knife holder;
    an adhesive material positioned between the knife holder and the base body for electrically isolating the knife holder and the at least one stripping knife from the base body, wherein the knife holder is firmly adhered to the base body by the adhesive material; and
    electrical connections for the reading out of electrical signals for determining contact of the at least one stripping knife with a conductor, said electrical connections making electrical contact with the metallic knife holder and thereby with the at least one stripping knife.

2. The cutting unit according to claim 1 wherein the adhesive material is an epoxy-resin adhesive.

3. The cutting unit according to claim 1 wherein the at least one stripping knife is attached to the knife holder by a releasable connection.

4. The cutting unit according to claim 3 wherein the at least one stripping knife is screw-connected with the knife holder by the releasable connection.

5. The cutting unit according to claim 1 wherein the base body has a recess receiving the knife holder.

6. The cutting unit according to claim 5 wherein the recess is pocket-shaped.

7. The cutting unit according to claim 1 including a printed circuit board attached to the base body and electrically connected with the knife holder for determining contact of the at least one stripping knife with a conductor.

8. The cutting unit according to claim 1 including front and back stripping knives for stripping a trailing and a leading cable end and a severing knife arranged between the front and back stripping knives, wherein the front and back stripping knives are arranged centrally at the base body at opposite outer sides of the base body and the severing knife.

9. A stripping station for stripping cables, with a knife head having an upper cutting unit and a lower cutting unit, comprising:
    at least one of the upper and lower cutting units including a metallic base body, a metallic knife holder mechanically attached to and electrically isolated from the base body, at least one stripping knife mechanically attached and electrically coupled to the knife holder, and an adhesive material positioned between the knife holder and the base body for electrically isolating the knife holder and the at least one stripping knife from the base body, wherein the knife holder is firmly adhered to the base body by the adhesive material; and
    a monitoring arrangement having an inductive or capacitive mode of functioning for assessing contact by the at least one stripping knife with a conductor of a cable being stripped, said monitoring arrangement including electrical connections for the reading out of electrical signals for determining contact of the at least one stripping knife with a conductor, said electrical connections making electrical contact with the metallic knife holder and thereby with the at least one stripping knife.

10. A method of producing a cutting unit for a stripping station for stripping cables comprising the steps of:
    providing a metallic base body and at least one stripping knife;
    providing a metallic knife holder mechanically attached to and electrically isolated from the base body and holding the at least one stripping knife, where the at least one stripping knife is electrically coupled to the knife holder;
    positioning an adhesive material between the knife holder and the base body;
    attaching the knife holder to the base body wherein the adhesive or sealing material electrically isolates the knife holder and the at least one stripping knife from the base body; and
    establishing electrical connections for the reading out of electrical signals for determining contact of the at least one stripping knife with a conductor, said electrical connections making electrical contact with the metallic knife holder and thereby with the at least one stripping knife.

11. The method according to claim 10 including forming the knife holder, gluing the knife holder to the base body and after the gluing finishing the knife holder to a desired size.

12. The method according to claim 11 including forming the cutting unit with an upper cutting unit and lower cutting unit each having one of the base body with respective knife holders glued thereto and finishing the knife holders of the two base bodies in a common finishing step to the desired size.

* * * * *